S. J. Bye's Corn Planter.

No. 116552

Patented Jul 4 1871

Witnesses:
Chas. Nida
Wm. H. C. Smith

Inventor:
S. J. Bye
Per —— Attorneys.

UNITED STATES PATENT OFFICE.

SAMUEL J. BYE, OF BLUFF POINT, INDIANA, ASSIGNOR TO HIMSELF AND WILLIAM C. BYE, OF SAME PLACE.

IMPROVEMENT IN CORN-PLANTERS.

Specification forming part of Letters Patent No. 116,552, dated July 4, 1871.

*To all whom it may concern:*

Be it known that I, SAMUEL J. BYE, of Bluff Point, in the county of Jay and State of Indiana, have invented a new and useful Improvement in Corn-Planters; and I do hereby declare that the following is a full, clear, and exact description thereof, which will enable others skilled in the art to make and use the same, reference being had to the accompanying drawing forming part of this specification, in which—

Figure 1:
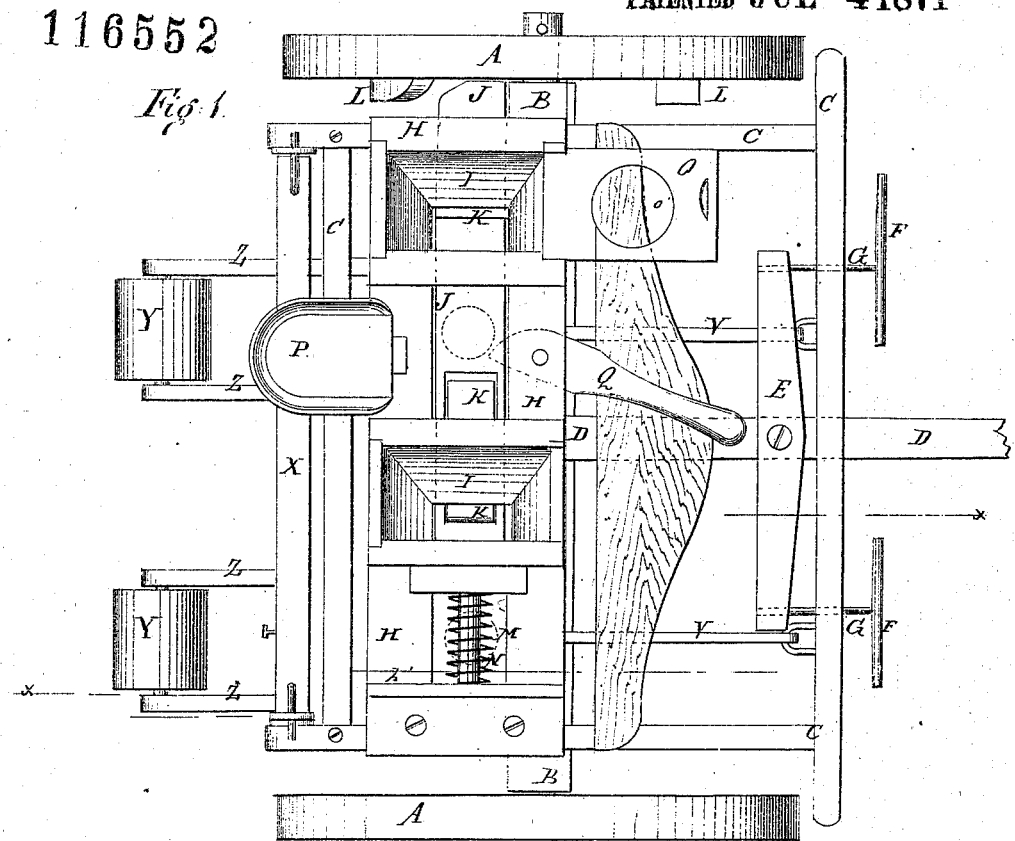
Figure 2:
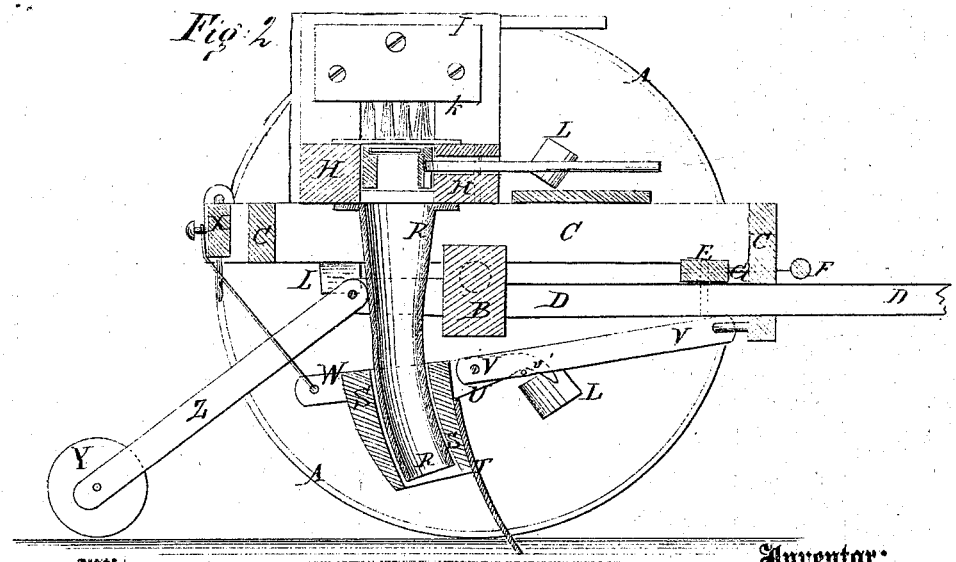

Figure 1 is a top view of my improved corn-planter. Fig. 2 is a detail vertical section of the same taken through the line $x\ x$, Fig. 1.

Similar letters of reference indicate corresponding parts.

My invention has for its object to furnish an improved corn-planter, simple in construction, strong, durable, and effective, and reliable in operation; and it consists in the construction and combination of the various parts of the machine, as hereinafter more fully described.

A are the wheels, which revolve upon the journals of the axle B, to which the frame C is attached. D is the tongue, which is attached to the axle B, and passes through a hole in the front cross-bar of the frame C. E is the double-tree, which is pivoted to the tongue D in the rear of the front cross-bar of the frame C, and with the ends of which the whiffletrees F are connected by the rods G, which pass through holes in the front cross-bar of the frame C, the said whiffletrees being in front of the said cross-bar. H is the platform, to which the hoppers I are attached, and which is attached to the frame C. The platform H is grooved or channeled upon its upper side to receive the slide J, which passes beneath the hoppers I and forms the bottom of said hoppers. In the slide J are formed holes in such positions as to enter the hoppers, become filled with corn and carry it outside of the hoppers, where it falls through holes in the platform H. K are metallic plates adjustably secured to the said slide J by screws which pass through slots in the said plates K, so that the said plates can be conveniently moved to regulate the size of the holes in the slide J according to the amount of seed desired for a hill. $k'$ is a brush attached to the side of the hoppers I to prevent any more corn from being carried out by the slide J than enough to fill the holes in said slide. The slide J is pushed at the proper time in the direction to drop the seed by cam projections L formed upon or attached to one of the wheels A, and which strike against the inclined end of the slide J. The slide J is pushed back, when released from the cam projections L, by the coiled or equivalent spring M interposed between the end of the slide J and the cross-bar $h'$ attached to the end of the platform H. The spring M is kept in place by the guide-rod N, formed upon or attached to the end of the slide J, and which passes through a hole in the bar $h'$. The bar $h'$ is detachable to enable the slide J to be conveniently removed when desired. The hoppers I are provided with sliding covers O having glass plates $o'$ set in them, so that the driver from his seat P can see the corn in the said hoppers. Q is a lever, pivoted in a slot in the platform H, and the end of which enters a notch in the side edge of the slide J, so that by operating the said lever the driver can throw the slide out of the reach of the cams L. The wheels A may have projections formed upon or attached to their tiers or rims to make the rows. To the under side of the platform H, directly around the holes in said platform, are attached the upper ends of the flexible tubes R, made of rubber or other suitable material, and which conduct the seed to the ground. The lower parts of the tubes R pass down through the tubular standards S, to which the plows T are attached, so that the corn may be deposited in the furrow in the rear of and close to the plows T. Upon the forward side of the upper part of the standards S are formed or to them are rigidly attached two parallel arms, U. V is the draft-bar, the forward end of which is pivoted to the front cross-bar of the frame C. The rear end of the draft-bar V is placed between the arms U, and is pivoted to said arms near their bases. The forward parts of the arms U pass above and rest upon a wooden pin, $v'$, passed through the draft-bar V, so that, should the plows strike an obstruction, the said wooden pin $v'$ will break and allow the plow-standard to swing back, thus guarding the machine from breakage. Upon the rear side of the upper ends of the standards S are formed or to them are attached arms W, to receive the ends of cords, the other ends of which are attached to eyebolts or other fastenings attached to the rear side of a bar, X, which is pivoted at the ends of its upper edge to the frame C, so that by turning the said bar up the said cords may be wound upon it and the plows raised from the ground. Y are the covering-rollers, each of which is pivoted to the rear end of a frame, Z, the forward end of which is pivoted to studs attached to the axle B or frame C in such positions that a roller may follow each plow and cover the seeds.

Having thus described my invention, I claim as new and desire to secure by Letters Patent—

The arrangement of the platform H, hoppers I, slide J, cam projections L, adjustable plates K, brushes $k'$, spring M, lever Q, flexible conducting-tubes R, tubular standards S, arms U, draft-bars V, wooden pins $v'$, arms W, pivoted bar X, rollers Y, and pivoted frames Z, with respect to each other and the frame C, axle B, and wheels A, substantially as herein shown and described.

SAMUEL J. BYE.

Witnesses:
W. T. GIFFE,
JOHN W. HEADINGTON.